United States Patent
Liu et al.

(10) Patent No.: US 7,961,262 B2
(45) Date of Patent: Jun. 14, 2011

(54) LIQUID CRYSTAL DISPLAY AND MANUFACTURING METHOD THEREOF

(75) Inventors: Junguo Liu, Beijing (CN); Chun Bae Park, Beijing (CN); Tae Yong Eom, Beijing (CN); Hong Zhu, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 422 days.

(21) Appl. No.: 11/952,262

(22) Filed: Dec. 7, 2007

(65) Prior Publication Data

US 2008/0142819 A1     Jun. 19, 2008

(30) Foreign Application Priority Data

Dec. 13, 2006   (CN) .............. 2006 1 0165139

(51) Int. Cl.
*G02F 1/1335*   (2006.01)
*G02F 1/1339*   (2006.01)
*G02F 1/1341*   (2006.01)

(52) U.S. Cl. ........... 349/40; 349/106; 349/189; 349/190

(58) Field of Classification Search .............. 349/40, 349/189, 190
See application file for complete search history.

(56) References Cited

U.S. PATENT DOCUMENTS

| | | | |
|---|---|---|---|
| 5,847,787 A * | 12/1998 | Fredley et al. | 349/89 |
| 7,265,806 B2 | 9/2007 | Ueda | |
| 2005/0079296 A1 | 4/2005 | Kobayashi et al. | |
| 2006/0092369 A1 | 5/2006 | Nishi | |
| 2007/0171334 A1 * | 7/2007 | Jeng et al. | 349/86 |
| 2007/0246707 A1 | 10/2007 | Deng | |
| 2007/0272926 A1 | 11/2007 | Deng | |
| 2007/0298554 A1 | 12/2007 | Long | |
| 2008/0030639 A1 | 2/2008 | Qiu | |
| 2008/0061295 A1 | 3/2008 | Wang | |
| 2008/0100766 A1 | 5/2008 | Ming | |
| 2008/0105873 A1 | 5/2008 | Wang | |
| 2008/0105874 A1 | 5/2008 | Wang | |
| 2008/0111136 A1 | 5/2008 | Qiu | |
| 2008/0111934 A1 | 5/2008 | Wu | |
| 2008/0117347 A1 | 5/2008 | Zhang | |
| 2008/0123007 A1 | 5/2008 | Cui | |
| 2008/0123030 A1 | 5/2008 | Song | |
| 2008/0142802 A1 | 6/2008 | Qiu | |
| 2008/0164470 A1 | 7/2008 | Wang | |
| 2008/0166838 A1 | 7/2008 | Long | |

FOREIGN PATENT DOCUMENTS

| | | |
|---|---|---|
| CN | 1703652 A | 11/2005 |
| CN | 1774492 A | 5/2006 |

OTHER PUBLICATIONS

U.S. Appl. No. 12/104,575, filed Apr. 17, 2008.

* cited by examiner

*Primary Examiner* — Jerry T Rahll

(74) *Attorney, Agent, or Firm* — Hasse & Nesbitt LLC; Daniel F. Nesbitt

(57) ABSTRACT

A liquid crystal display (LCD) and a manufacturing method thereof. The LCD comprises a color filter substrate, an array substrate disposed opposite to the color filter substrate, and a liquid crystal layer sealed between the two substrates, wherein a conductive nano-particle is introduced between the two substrates.

12 Claims, 2 Drawing Sheets

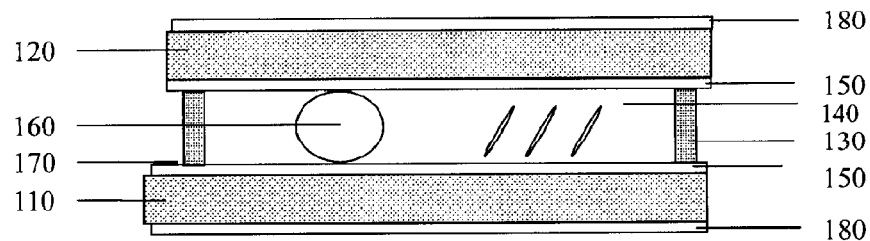
Figure 1 – Prior art
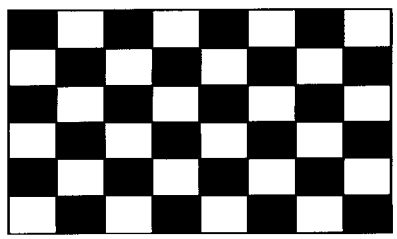      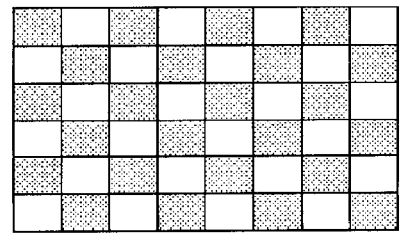
Figure 2A – Prior art         Figure 2B – Prior art
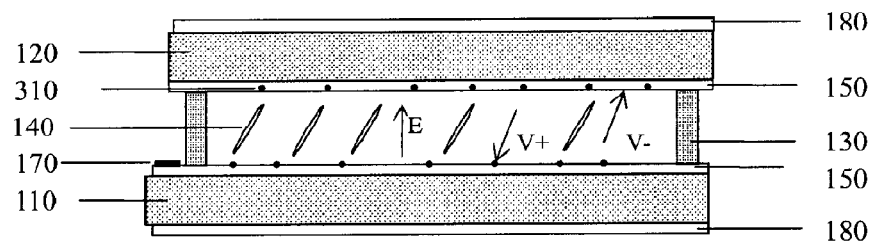
Figure 3

LIQUID CRYSTAL DISPLAY AND MANUFACTURING METHOD THEREOF

BACKGROUND OF THE INVENTION

The present invention relates to a liquid crystal display (LCD) and a manufacturing method thereof.

Among the various flat panel displays, LCDs are popularly used for the display of information processing devices, such as mobile phone, personal computer, television, and personal digital assistant (PDA), due to thin thickness, light weight, low power consumption, and low electromagnetic radiation. As shown in FIG. 1, a traditional LCD is formed by assembling an array glass substrate (TFT substrate) 110 and a color filter substrate (C/F substrate) 120, which are opposing with each other, with a sealant 130. A dielectric anisotropic liquid crystal layer 140 is disposed between the two substrates, one alignment layers 150 is provided on the inner side of each of the substrates, respectively, and a plurality of spacers 160 are formed on the surface of the substrates. When an electric field is applied between a pixel electrode on the TFT substrate and a counter electrode on the C/F substrate through a driving circuit 170, the orientation of the liquid crystal molecules are modified and the transmittance of the LCD can be changed to display images by controlling the magnitude of the applied electric field, along with a upper and a lower polarized plates 180 that are provided on the outer sides of the substrates, respectively. As image to be displayed becomes enrich, the requirement for display performance and image quality is improved, such as high luminance, high contrast, wide viewing angle, high response time, electrostatic protection, and minimal after-image.

After-image is one of the prominent defects in current LCDs. In general, after-image can be classified into plane after-image and line after-image. The plane after-image is generated from the direct current component in the driving voltage, which can be improved through the driving signal. Line after-image is common. After-image refers to a phenomenon that a previous image is retained on the screen of a LCD when the screen is switched from the previous image to a next image such as a low gray scale image after the previous image has been displayed on the screen for a long time. For example, a previous image of checkerboard is displayed for a long time as shown in FIG. 2A, a faint image of chessboard is left on the screen as in FIG. 2B when the screen is switched to a low gray scale image. The ions in the cell of the LCD move towards the upper and lower substrates along the direction of the applied electric field, respectively, and accumulate on the alignment layers during displaying. The accumulated ions generate static electricity. When the static electricity generated by the ions is high enough to change the transmittance of the liquid crystal layer, the display of the LCD will be affected disadvantageously. When the screen is switched to the next image, the accumulated ions cannot immediately leave the alignment layers and the previous image will remains, and thus after-image appears.

In theory, there are two methods to decrease the after-image. One is to reduce the amount of ions in the LCD. The ions in the panel mainly come from the material used, including the liquid crystal material, alignment layers, sealant, spacers, electrodes, and so on. A portion of the ions are brought in by the impure material, a portion of the ions are derived from the partial decomposition of the materials due to the applied voltage, high temperature, light illumination, and so on in a manufacturing process, and thus introduction of ions can be reduced by improving the purity of the materials. The other method is to improve the antistatic ability of the substrates of the LCD. The current method to improve the antistatic ability of the substrates mainly comprises improving the circuit design of the active elements of the TFT substrate, coating antistatic film on the surface of the substrates, and so on. However, the above methods cannot essentially eliminate the after-image.

BRIEF DESCRIPTION OF THE INVENTION

In view of the above problems, the present invention is to provide a liquid crystal display and a manufacturing method thereof.

In one aspect, the present invention provides a liquid crystal display comprising a color filter substrate, an array substrate disposed opposite to the color filter substrate, and a liquid crystal layer sealed between the said two substrates. Conductive nano-particles are introduced between the two substrates.

Preferably, the conductive nano-particles may have a diameter ranges from about 10 nm to about 70 nm. The conductive nano-particles may be carbon-based nano-particles, silicon-base nano-particles, indium tin oxide nano-particles, gallium nitride nano-particles, or semiconductor nano-particles. The conductive nano-particles may be mixed with liquid crystal in the liquid crystal layer.

Preferably, an alignment layer may be formed on an inner side of each of the array substrate and the color filter substrate. Spacers may be provided between the array substrate and the color filter substrate.

In another aspect, the present invention further provides a method of manufacturing a liquid crystal display comprising the steps of providing an array substrate and a color filter substrate; dispensing a mixture solution of conductive nano-particles and liquid crystal onto the array substrate; and assembling the array substrate and the color filter substrate.

Preferably, the mixture solution of the conductive nano-particles and the liquid crystal may be dispensed onto the array substrate through a nozzle of a liquid crystal dispenser.

Preferably, a mass ratio of the conductive nano-particles to the liquid crystal ranges from about 0.01:100 to about 0.07:100.

Preferably, an alignment layer may be formed on an inner side of the array substrate, and the mixture solution of conductive nano-particles and liquid crystal may be dispensed on the alignment layer of the array substrate. Spacers may be provided between the array substrate and the color filter substrate.

In further another aspect, the present invention further provides a method of manufacturing a liquid crystal display comprising the steps of providing an array substrate and a color filter substrate; spraying a mixture of spherical spacers and conductive nano-particles onto the array substrate; dispensing liquid crystal onto the array substrate; and assembling the array substrate and the color filter substrate.

Preferably, the mixture of the spherical spacers and the conductive nano-particles may be sprayed onto the array substrate through a spherical spacer spraying equipment, and the liquid crystal is dispensed onto the array substrate through a nozzle of a liquid crystal dispenser.

Preferably, a mass ratio of the conductive nano-particles to the spherical spacers ranges from about 0.5:100 to about 3.5:100.

Preferably, an alignment layer may be formed on an inner side of the array substrate, and the mixture solution of the conductive nano-particles and the liquid crystal may be sprayed onto the alignment layer on the array substrate.

In the embodiments of the present invention, the conductive nano-particles are introduced between the substrates of a LCD, and therefore the probability of the positive and negative ions appearing is reduced due to the improved conductivity. On the other hand, the ions accumulate on the surfaces on the substrates because an image is displayed for a long time, and the accumulated ions can rapidly move away from the substrate when the screen of the LCD is switched to a next image due to presence of the conductive nano-particles, thus after-image will not appear and the image quality is improved.

In addition, the antistatic ability of the LCD is improved by introducing conductive nano-particles between the substrates of the LCD, thus the defects resulted from the electrostatic discharge (ESD) in a manufacturing process can be efficiently reduced and the yield can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter, and the accompanying drawings, which are given by way of illustration only and thus are not limitative and wherein:

FIG. 1 is a schematic view of the structure of a conventional TFT LCD in the related art.

FIGS. 2A and 2B are schematic views of after-image produced in the conventional TFT LCD.

FIG. 3 is a schematic view of the structure of a LCD according to the first embodiment of the present invention.

DETAILED DESCRIPTION OF THE PREFERRED EMBODIMENTS

Figure 4:
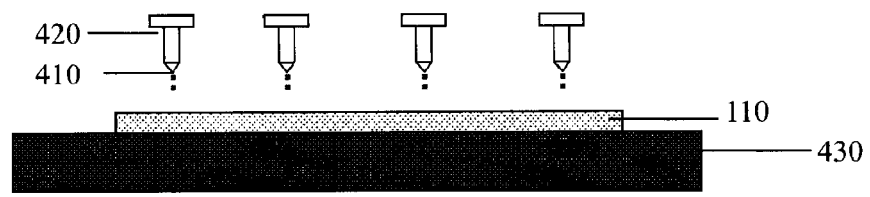
FIG. 4 is a schematic view of dispensing liquid crystal and conductive nano-particles according to the second embodiment of the present invention.

Exemplary embodiments of the present invention will be described hereinafter with reference to the accompanying drawings. The invention may, however, be embodied in many different forms and should not be construed as being limited to the embodiments set forth herein. It should be understood that in this description when a layer or a element is referred to as being "on" or "connected to" another layer or element, this layer or element can be directly on or directly connected to the other layer or element, or an intervening layer may also be present. For simplicity, elements similar to those in the related art are indicated with the similar numerals.

The First Embodiment

FIG. 3 is a schematic view of the structure of a LCD according to the first embodiment of the present invention, which illustrates the function of conductive nano-particles.

As shown in FIG. 3, the LCD according to the first embodiment of the present invention is a thin film transistor liquid crystal display (TFT LCD), such as a transmissive type TFT LCD. The panel of the TFT LCD comprises an array substrate 110 and a color filter substrate 120. The array substrate 110 and the color filter substrate 120 may each comprise a glass substrate and are assembled together by a sealant 130. Between the array substrate 110 and the color filter substrate 120, a dielectric anisotropic liquid crystal layer 140 is provided, one alignment layer 150 is formed on the inner surface of each of the substrates 110 and 120, and spacers 160 are disposed between the substrates 110 and 120. The spacers 160 keep a predetermined spacing between the array substrate 110 and the color filter substrate 120. The spacers 160 may be spherical spacers or post spacers.

Conductive nano-particles 310 are introduced between the array substrate 110 and the color filter substrate 120, and the conductive nano-particles 130 have a diameter range from about 10 nm to about 70 nm. The example of the conductive nano-particles comprises conductive or semiconductive nano-particles, such as carbon-based nano-particles, silicon-based nano-particles, indium tin oxide nano-particles, and gallium nitride nano-particles. The manufacturing process for the conductive nano-particles can referred to the process flows currently used in industry.

When applying a voltage between a pixel electrode (not shown) on the array substrate 110 and a counter electrode (not shown) on the color filter substrate 120 through a driving circuit 170 in the non-display area of the array substrate 110 to form an electric field between the electrodes so as to modify the orientation of the liquid crystal molecules, with cooperation of an upper and a lower polarized plates 180 disposed on the exterior sides of the array substrate 110 and the color filter substrate 120 in the transmissive type LCD, various image display can be achieved by controlling the magnitude of the applied electric field to change the transmittance of the LCD.

As shown in FIG. 3, "E" represents the direction of the electric field generated between the array substrate 110 and the color filter substrate 120; "V+" represents the moving direction of the positive ions in the liquid crystal layer 140; and "V−" represents the moving direction of the negative ions in the liquid crystal layer 140. When forming an electric field in the LCD by applying a voltage, the positive/negative ions in the liquid crystal layer 140 of the LCD move towards the array glass substrate 110 at high voltage and the color filter glass substrate 120 at low voltage, respectively, under the effect of the electric field. When a same image is displayed on the screen of the LCD for a long time, the electric field is kept in the same direction, and thus the positive/negative ions keep accumulating towards the surfaces of the array substrate 110 and the color filter substrate 120, respectively, specifically on the surfaces of the alignment layers 150. When the accumulation reaches a predetermined level, if switching of the image changes the magnitude or direction of the applied electric field, the built-in electric field generated due to the accumulated positive/negative ions tends to retain the previous image, and thus after-image appears. However, in the LCD according to the first embodiment of the present invention, since the conductive nano-particles 130 are introduced between the substrates 110 and 120, the accumulated ions can rapidly move away from the alignment layers 150 through the conductive nano-particles 130 upon switching to the next image, and thus after-image does not appear. Meanwhile, the presence of the conductive nano-particles improves the conductivity of the glass substrate, reduces the probability of static occurring, and thus reduces the defect rate due to the static in a manufacturing process.

The LCD of the first embodiment of the present invention may be manufactured by the following exemplary methods, and these exemplary methods are not limitative to the present invention.

The Second Embodiment

Firstly, after the formation of the array substrate 110 and the color filter substrate 120, forming the alignment layers 150 by performing a serial of processes, such as cleaning, coating material of the alignment layer, rubbing, and the like, on the inner side of each of the array substrate 110 and the color filter substrate 120. The thickness of the alignment layers is about 5 nm to about 100 nm.

Then, after cleaning the array substrate 110 and the color filter substrate 120 formed with the alignment layers 150, a mixture solution 410 comprising the conductive nano-particles and the liquid crystal material is dispensed on the alignment layers 150 of the array substrate 110 on a base stage 430 through a nozzle 420 of a liquid crystal dispenser (not shown). The mass ratio of the conductive nano-particles to the liquid crystal ranges from about 0.01:100 to about 0.07:100. FIG. 4 is a schematic view showing dispensing the mixture solution comprising the liquid crystal material and the conductive particles in the present embodiment when the spacers 160 are post spacers.

Finally, the color filter substrate 120 is assembled with the array substrate 110 through the sealant 130 applied by printing, and then a LCD substantially without after-image is formed by a serial of processes such as cutting, cleaning, and so on.

The Third Embodiment

Firstly, after the formation of the array substrate 110 and the color filter substrate 120, forming the alignment layers 150 by performing a serial of processes, such as cleaning, coating material for the alignment layer, rubbing, and the like, on the inner side of each of the array substrate 110 and the color filter substrate 120. The thickness of the alignment layers is about 50 nm to about 100 nm.

Figure 5:
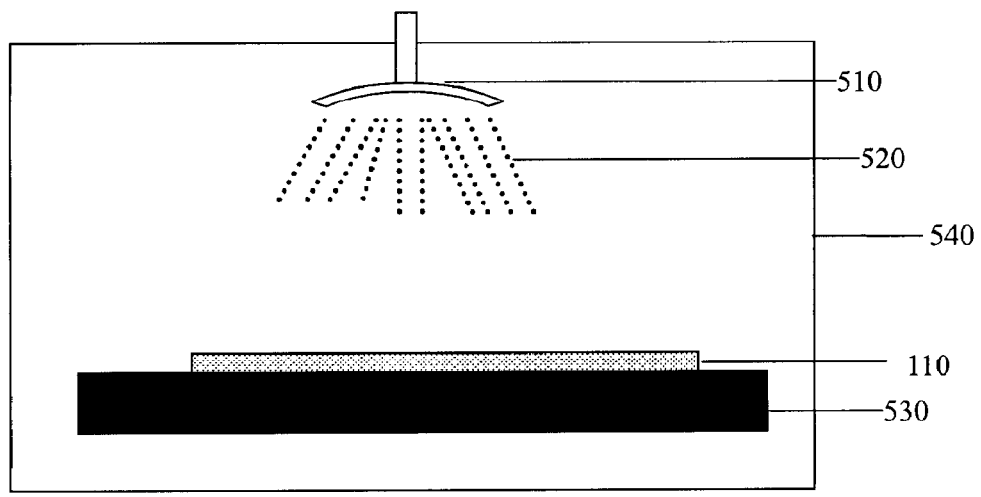
FIG. 5 is a schematic view of spraying spherical spacer and conductive nano-particles according to the third embodiment of the present invention.

Then, after cleaning the array substrate 110 and the color filter substrate 120 formed with the alignment layer 150, the array substrate 110 is transported to a base stage 530 of a spherical spacer spraying chamber 540, the mixture 520 of spherical spacers and the conductive nano-particles is sprayed on the surface of the alignment layer of the array substrate 110 through a nozzle of a spherical spacer spraying equipment 510. The mass ratio of the conductive nano-particles to the spherical spacers ranges from about 0.5:100 to about 3.5:100. FIG. 5 is a schematic view showing spraying the mixture of the spherical spacer and the conductive nano-particles on the surface of the alignment layer of the array substrate in the present embodiment when spacers are spherical spacers.

Finally, a LCD substantially without after-image is formed by a serial of processes such as cutting, cleaning, and so on.

Although the present invention has been described in detail referring to the preferred embodiments, the above embodiments are used only for illustration and not for the purpose of limitation. Accordingly, it will be understood by those of ordinary skill in the art that it is possible to use other materials and equipments if necessary, and that various modifications or equivalent alterations may be made to the embodiments of the present invention without departing from the spirit and scope of the present invention as set forth in the following claims.

What is claimed is:

1. A method of manufacturing a liquid crystal display, comprising the steps of:
   providing an array substrate and a color filter substrate;
   dispensing a mixture solution of conductive nano-particles and liquid crystals onto the array substrate; and
   assembling the array substrate and the color filter substrate.

2. The method according to claim 1, wherein a mass ratio of the conductive nano-particles to the liquid crystals ranges from about 0.01:100 to about 0.07:100.

3. The method according to claim 1, wherein the conductive nano-particles are selected from the group consisting of carbon-based nano-particles, silicon-base nano-particles, indium tin oxide nano-particles, gallium nitride nano-particles, semiconductor nano-particles, and a mixture thereof.

4. The method according to claim 1, wherein the mixture solution of the conductive nano-particles and the liquid crystals is dispensed onto the array substrate through a nozzle of a liquid crystal dispenser.

5. The method according to claim 1, wherein an alignment layer is formed on an inner side of the array substrate, and the mixture solution of conductive nano-particles and liquid crystals is dispensed on the alignment layer of the array substrate.

6. The method according to claim 1, further comprising providing spacers between the array substrate and the color filter substrate.

7. A method of manufacturing a liquid crystal display, comprising the steps of:
   providing an array substrate and a color filter substrate;
   spraying a mixture of spherical spacers and conductive nano-particles onto the array substrate;
   dispensing liquid crystal onto the array substrate; and
   assembling the array substrate and the color filter substrate.

8. The method according to claim 7, wherein a mass ratio of the conductive nano-particles to the spherical spacers ranges from about 0.5:100 to about 3.5:100.

9. The method according to claim 7, wherein the conductive nano-particles are selected from the group consisting of carbon-based nano-particles, silicon-base nano-particles, indium tin oxide nano-particles, gallium nitride nano-particles, semiconductor nano-particles, and mixtures thereof.

10. The method according to claim 7, wherein the mixture of the spherical spacers and the conductive nano-particles is sprayed onto the array substrate through a spherical spacer spraying equipment.

11. The method according to claim 7, wherein the liquid crystal is dispensed onto the array substrate through a nozzle of a liquid crystal dispenser.

12. The method according to claim 7, wherein an alignment layer is formed on an inner side of the array substrate, and the mixture solution of the conductive nano-particles and the liquid crystals is sprayed onto the alignment layer on the array substrate.

* * * * *